Jan. 13, 1959  E. G. LINDGREN  2,867,853
PORTABLE STRUCTURE

Filed June 30, 1955  5 Sheets-Sheet 1

Inventor.
Edwin G. Lindgren.
By Fidler, Crouse & Beardsley
Attorneys.

Jan. 13, 1959 E. G. LINDGREN 2,867,853
PORTABLE STRUCTURE
Filed June 30, 1955 5 Sheets-Sheet 3

Inventor,
Edwin G. Lindgren
By. Fidler, Crouse & Beardsley
Attorneys.

Jan. 13, 1959     E. G. LINDGREN     2,867,853
PORTABLE STRUCTURE
Filed June 30, 1955                                 5 Sheets-Sheet 4
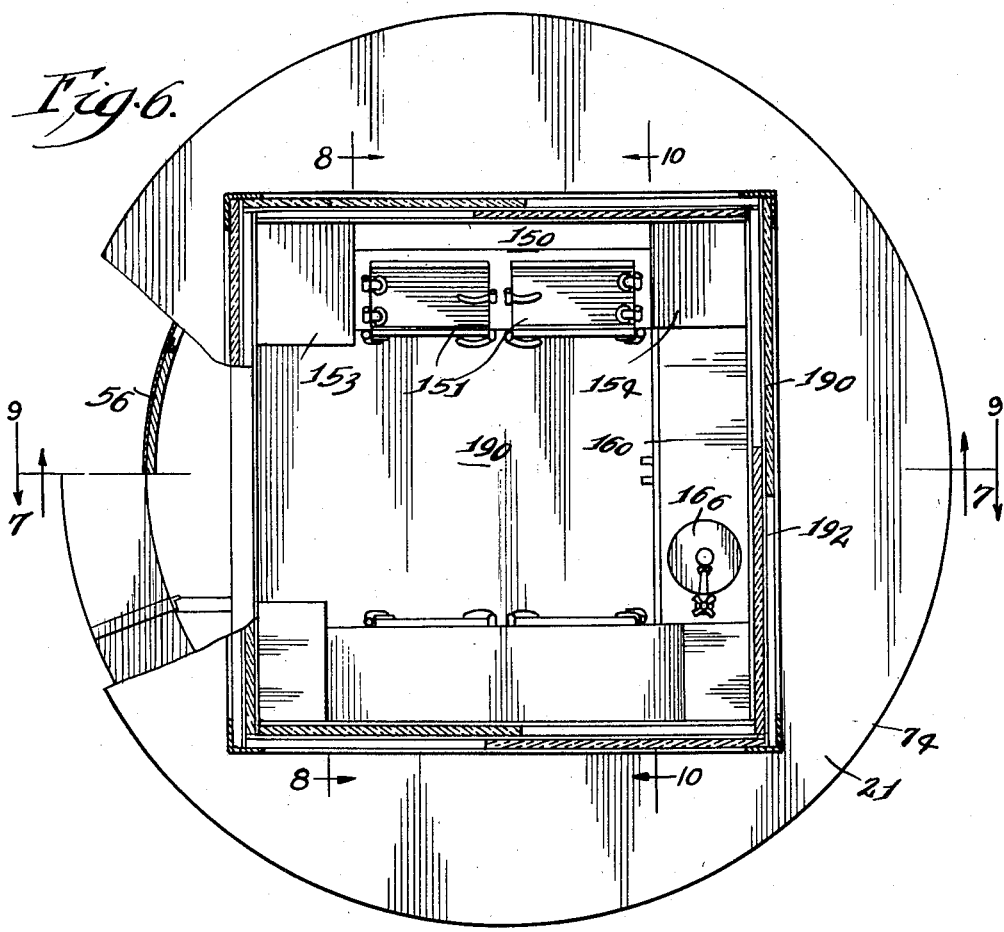
Inventor,
Edwin G. Lindgren,
By Fidler, Crouse & Beardsley
Attorneys.

Jan. 13, 1959  E. G. LINDGREN  2,867,853
PORTABLE STRUCTURE
Filed June 30, 1955  5 Sheets-Sheet 5
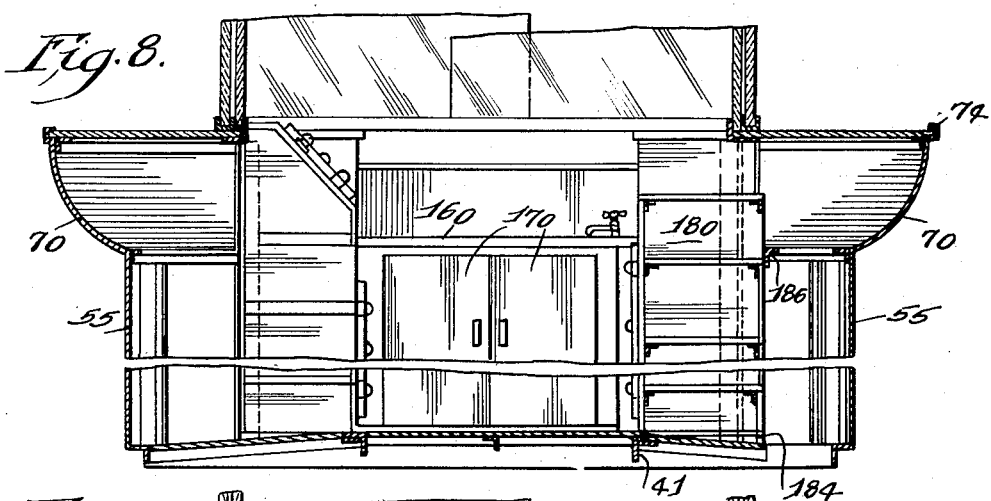
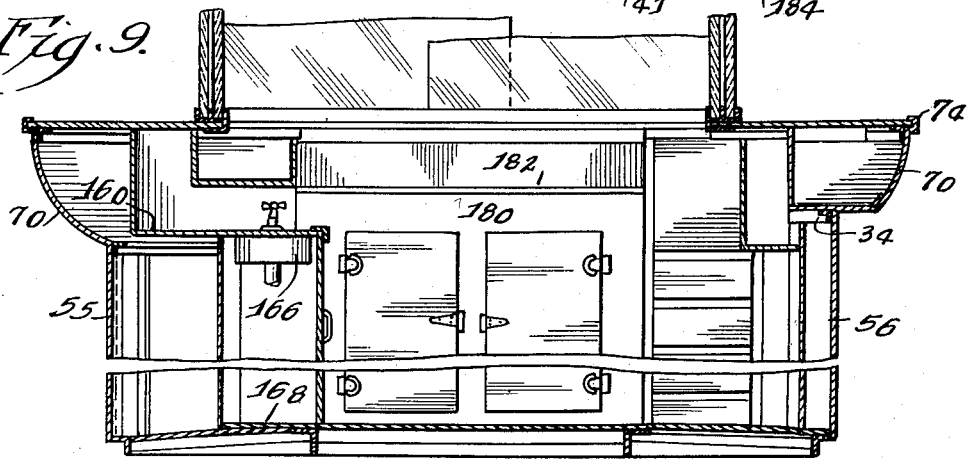
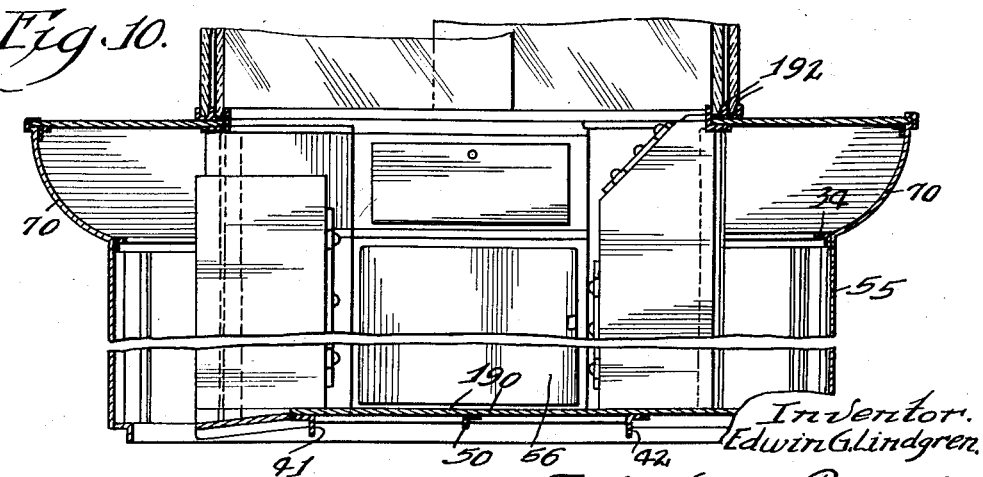

2,867,853
Patented Jan. 13, 1959

2,867,853

PORTABLE STRUCTURE

Edwin G. Lindgren, La Grange Park, Ill.

Application June 30, 1955, Serial No. 519,115

8 Claims. (Cl. 20—1.6)

The present invention relates generally to portable buildings and more particularly to a portable building suitable for use as a vending stand.

Vending stands suitable for dispensing foods, for example, usually represent a considerable investment in material, labor and appliances for preserving and preparing food and in order to show a reasonable profit from the operation of such stands a suitable location must be acquired where at least a certain average volume of business is assured.

Attractive, enclosed sanitary stands capable of storing foods so as to preserve their wholesomeness, and having appliances suitable for preparing a variety of foods and drinks are for this reason usually not available where a great number of people may be present but for only a limited time, such as, for example, at a race tracks, ball parks, carnivals or other places of public enterainment or special events, or where the volume of business is too greatly affected by the weather, such as in parks, beaches and other places that usually attract people in great numbers on warm, sunny days. It is, therefore, common to find food dispensed under the crudest conditions in places such as those enumerated above wherein a substantial investment is not justified.

It is, therefore, a general object of the present invention to provide a novel, sturdy and simple building unit arranged to accommodate permanently various types of appliances or apparatus associated with the activities for which the building is to be utilized and constructed so that it can readily be moved from place to place as business reasons may dictate.

Another object is to provide a novel, portable structure having a metal framework so constructed as to resist deformation whether it is resting on the ground or hanging from an overhead support.

Another object is to provide a novel vending stand having metal framework so constructed as to resist deformation whether resting on a base support or suspended from an overhead support and so arranged that a continuous counter surrounds the working space of the person serving it.

Still another object is to provide a novel, portable, self-contained dispensing unit that may readily and without danger of damage be moved from site to site, in accordance with the volume of prospective business available.

These and other objects and advantages of the present invention will be apparent from the following description when taken with the accompanying drawings in which:

Fig. 6 is a plan view of the counter taken along line 6—6 of Fig. 1, showing the arrangement of the service appliances;

Fig. 7 is a cross-sectional view of the lower part of the stand taken along lines 7—7 of Fig. 6;

Fig. 8 is a cross-sectional view of the lower part of the stand taken along line 8—8 of Fig. 6;

Fig. 9 is a cross-sectional view of the lower part of the stand, taken along line 9—9 of Fig. 6; and Fig. 10 is a cross-sectional view of the lower part of the stand, taken along line 10—10 of Fig. 6.

Figure 1:
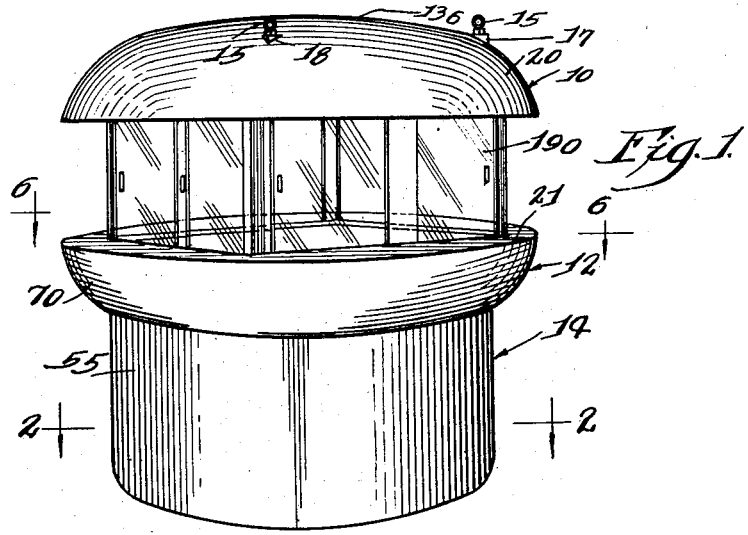
Fig. 1 is a perspective view of a vending stand in accordance with the present invention.

It will be seen from Fig. 1 that the unit illustrated is in the general shape of a split circular bun having an upper portion 10 forming the roof section of the unit, a lower portion 12 forming the dispensing section and a circular cylindrically shaped base section 14. The framework of the unit is preferably fabricated throughout from angle iron stock for maximum strength and is covered by stainless steel sheathing which renders the unit impervious to weather and gives it a very attractive appearance. In the following description of the construction of the framework all the various members making up the framework will be assumed to be made from angle iron stock unless otherwise noted. The orientation of the angle stock will be established by stating the direction in which the two flat external sides that form the external right angle of the members face.

In accordance with one feature of the present invention, the framework of the unit is so constructed that the unit will stand stably on a horizontal foundation or on a flat supporting surface without having to be secured thereto and so that the unit may readily be lifted by four spaced eye bolts 15 for transportation to a new location whenever desired.

Figure 3:
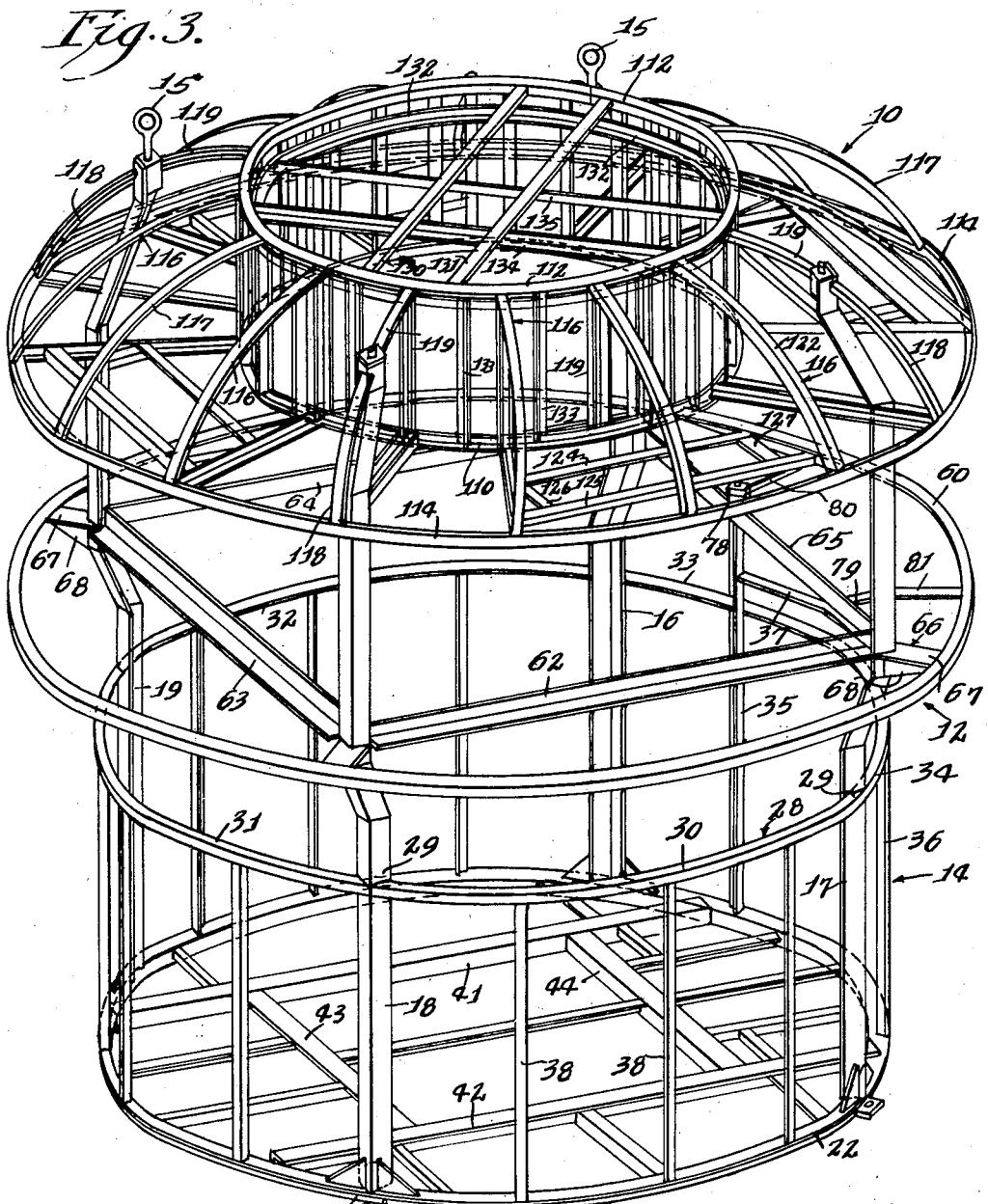
Fig. 3 is a perspective view of the metal framework skeleton of the stand.

As better seen in Fig. 3, the main load carrying supporting members of the frame structure consist of four generally vertically extending main frame members or columns 16, 17, 18 and 19, so disposed as to form the corners of a square, with the flat sides of the columns facing outwardly. The columns 16 to 19 extend straight upwardly parallel to each other from the bottom of the unit up to or a little above the top of the cylindrical base section 14 where they diverage at an angle outwardly to near the level of the top of the dispensing section 12 from which they extend vertically to a point somewhat above the bottom of the roof section 10. From there the columns converge inwardly to points about halfway up the curved roof surface 20 from which points they extend straight upwardly until they just break through the roof surface line. Heavy duty eyebolts 15 (Fig. 1) are rigidly secured as by welding to the ends of frame members 16 to 19 so that the entire unit may be lifted by fastening thereto.

The dispensing section 12 and the cylindrical base section 14 house the various appliances and implements necessary for the particular business for which the unit is intended to be used and the counter surface 21 of the dispensing section 12 forms a generally circular service counter outside the square formed by the four columns 16 to 19. The lower ends of the columns 16 to 19 rest on a base ring 22 (Fig. 3) which faces down and out. The lower ends of the upright columns 16 to 19 are supported on and welded to the top surface of the base ring 22. For added rigidity, a triangular gusset plate 24 is welded between each side of each of the columns and the base ring 22. An intermediate ring 28 that faces out and up defines the juncture between the base section 14 and the dispensing section 12 of the unit. The ring 28 is made up of three segments 30, 31 and 32 spanning the spaces between the adjacent columns 17 and 18, 18 and 19, and 19 and 16, respectively, and two smaller segments 33 and 34 spanning the spaces between the column 16 and a vertical frame member 35 and between the column 17 and the vertical frame member 36, respectively. The ring is interrupted between the frame members 35 and 36 to leave space for an access opening. A segment 37 extends between the frame members 35 and 36 to define the top of the access opening. The outside radius of the segments 30 to 34 and 37 is the same as that of the base ring 22. A plurality of equally spaced, vertical ribs 38 are secured between the base ring 22 and the ring 28 and are oriented so that one face each of the ribs is substantially coextensive with the outer surfaces of the rings.

Figure 2:
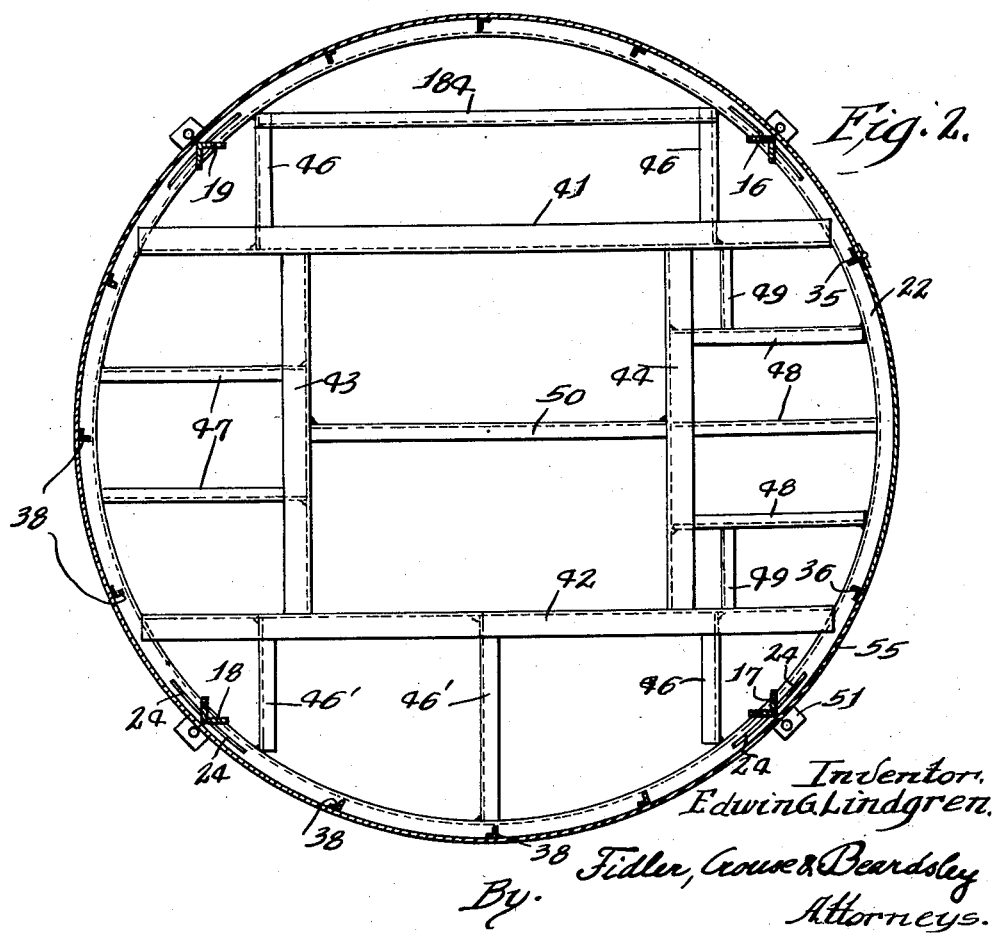
Fig. 2 is a cross-sectional view taken along line 2—2 of Fig. 1 showing the layout of the floor supports of the base.

The construction of the floor supporting framework is shown in Fig. 2. A pair of spaced parallel floor support and spreader members 41 and 42 bridge the base ring 22 on opposite sides of the center of the ring and are spaced from the center by a distance about half the radius of the ring. A pair of spaced floor support members 43 and 44 bridge the members 41 and 44 so as to form substantially a square therewith in the middle of the base ring. The members 41 to 44 are made from angle stock somewhat larger than that of the base ring 22 and are oriented to face up and inwardly toward the center of the base ring. Cross braces 46 are secured between the floor member 41 and the base ring 22 and cross braces 46' are secured between the floor member 42 and the base ring. The cross braces 47 normal to the support member 43 are provided between the latter and the ring 22 and three cross braces 48 are likewise provided between the support member 44 and the ring. Additional support braces 49 are provided between the outside ones of the braces 48 and the adjacent support members 41 and 42 in order to provide additional rigidity in this area which is used as the entrance for the unit. A cross brace 50 is secured between the floor supports 43 and 44. Mounting lugs 51 are rigidly secured to the base ring 22 and extend outwardly from the underside of the latter at the locations of the columns 16 to 19 for bolting the unit to a foundation if desired.

It should here be noted that by making the floor supporting members 41 to 44 of larger angle iron stock than that of the base ring 22, and by securing the ends of the braces 46 to 49, which are made of the same angle stock as that of base ring 22, so that the top surfaces thereof are flush with the top surfaces of the members to which they are secured, these braces will provide supports that slope downwardly toward the base ring. This is of considerable convenience in disposing of water that may be intercepted by surfaces supported on the braces and in preventing this water from running out on the floor supported on the square frame structure defined by the floor support members 41 to 44 and on the cross brace 50.

The base portion 14 is suitably covered by a preformed circular cylinder sheet 55 of pressed steel that terminates at the vertical frame members 35 and 36, and a door 56 hinged to the frame member 35 and extending across the access opening defined by the frame members 35 and 36 and the arcuate bridging segment 37 completes the cylinder. In order to facilitate ingress and egress through the door, it is extended partly up into the dispensing portion 12 of the unit in the manner better shown in Figs. 7 and 9.

The dispensing section 12 is defined between a circular ring 60 (Fig. 3) and four angle beams 62, 63, 64 and 65 rigidly secured between the vertical columns 16 to 19 to form a square, each of the beams being disposed to have one edge extending vertically upwardly and the other horizontally inwardly at the level of the top surface of the ring 60. The horizontal sides of the angle beams 62 to 65 are notched at each end to receive the sides of the vertical columns 16 to 19. The notches in the beams 62 to 65 are of such depth as to provide a spacing between the sides of the columns and the adjacent vertical sides of the beams just sufficient to receive therebetween two parallel tracks for sliding glass panels (see Fig. 6). The ring 60 is supported by the columns 16 to 19 by means of a plurality of brackets 66 which each consists of a flat horizontal piece 67 and a right angle triangular vertically disposed supporting gusset 68. Each of the flat pieces 67 is notched at one end to receive the outside angle of the column and has the other end rounded to conform with the inner edge of the ring 60. A curved covering 70 (Fig. 1) extends between the counter ring 60 and the intermediate ring 28 and is preferably preformed from sheet steel of sufficiently heavy gage to maintain its shape without the use of forming ribs. The covering 70 is dimensioned so as to fit snugly over the rings 60 and 28. The covering 70 is secured to the rings 60 and 28 in any convenient manner such as by welding or riveting. The counter top 21 (Fig. 6) is of sheet metal such as chromium plated stainless steel, for example, to provide an attractive, sanitary surface. The counter top 21 rests on the upper surface of the ring 60, on the horizontal side portions of the beams 62 to 65, and on the flat horizontal pieces 67 of the brackets 66. A molding piece 74 is fitted over the peripheral edge of the counter top 72 to provide a smooth edge for the counter. The molding piece 74 may suitably be made of chromium plated steel. Braces 78 and 79 (Fig. 3) respectively secured between the ends of the vertical frame members 35 and 36 and the beam 65, and braces 80 and 81 respectively secured between the frame members 35 and 36 and the counter ring 60 provide additional support for the counter top above the access door. It will be appreciated that by constructing the framework in the manner described, a very rigid assembly is provided which can be supported either from the main frame members 16 to 19 while the latter are suspended, or on the ground or on a suitable foundation if desired.

The construction of the roof section 10 of the unit and the manner in which it is supported from the vertical columns 16 to 19 will now be described with particular reference to Figs. 3 to 5. It was noted that the columns 16 to 19 extend inwardly at an angle from points at a level above the ceiling, i.e. the bottom surface of the roof section 10, so as to emerge well up on the rounded dome 20 (Fig. 1) of the unit. The framework for the upper section 10 is arranged so that it can be completely manufactured as a separate subassembly and then welded to the vertical columns 16 to 19. The framework for the roof section 10 comprises generally two vertically spaced, parallel rings 110 and 112 of substantially equal diameter, and a ring 114 of a diameter substantially equal to that of the counter ring 60, rigidly connected together by eight equally spaced roof brace assemblies 116 which together with four equally spaced curved ribs 117 and four pairs of rib portions 118 and 119, define the rounded dome of the roof section 10. The brace assemblies 116 are identical and each consists of a straight horizontal spreader leg 120 (Fig. 5) and a straight vertical rib leg 121 forming a right angle and a curved portion 122 bridging the ends of the legs. The eight brace assemblies 116 are assembled separately and then welded to the rings 110, 112 and 114 in the manner seen in Fig. 5, in equally spaced relationship. The rings 110, 112 and 114 are oriented so that the inside angles thereof face toward each other and the brace assemblies 116 are provided with recesses in the corners thereof for receiving the respective rings. In order to provide means for receiving recessed light fixtures, I provide four generally rectangular light fixture receiving frames each of which comprises two parallel bars 124 and 125 bridging the cross pieces 120 of the two adjacent brace assemblies 116 and two cross bars 126 and 127 secured between the bars 124 and 125 as seen in Figs. 3 and 4.

A pair of parallel spreaders 130 and 131 are connected in parallel across the top ring 112. A ring 132, whose outside diameter is about equal to the inside diameter of the rings 110 and 112 is disposed a short distance below the top ring 112 and securely welded to the vertical rib legs 121 of the brace assemblies 116, and to a plurality of vertical ribs 133 extending between the rings 110 and 112. A pair of parallel spreaders 134 and 135 are connected in parallel across the ring 132 at right angles to the spreaders 130 and 131. The upper ring 112 and the spreaders 130 and 131 form the support for the flat roof 136 of the unit, and the internal ring 132 and the spreaders 134 and 135 form the support to which the internal ceiling 137 of the unit is secured. The space between the roof 136 and the internal ceiling 137 serves as insulation and for added protection may be filled with an insulating filler. A ceiling 138, above the counter 12 is attached to the horizontal pieces 120 of the brace assemblies 116 between the rings 110 and 114 leaving openings within the light fixture receiving frames defined by the bars 124 to 127. The space between the curved dome cover 20 and the ceiling 138 attached to the underside and between the rings 110 and 114 may be used for storage by hinging doors (not shown) on the vertical legs 121 of the brace assemblies 116 or on the vertical ribs 133.

Figures 4, 5:
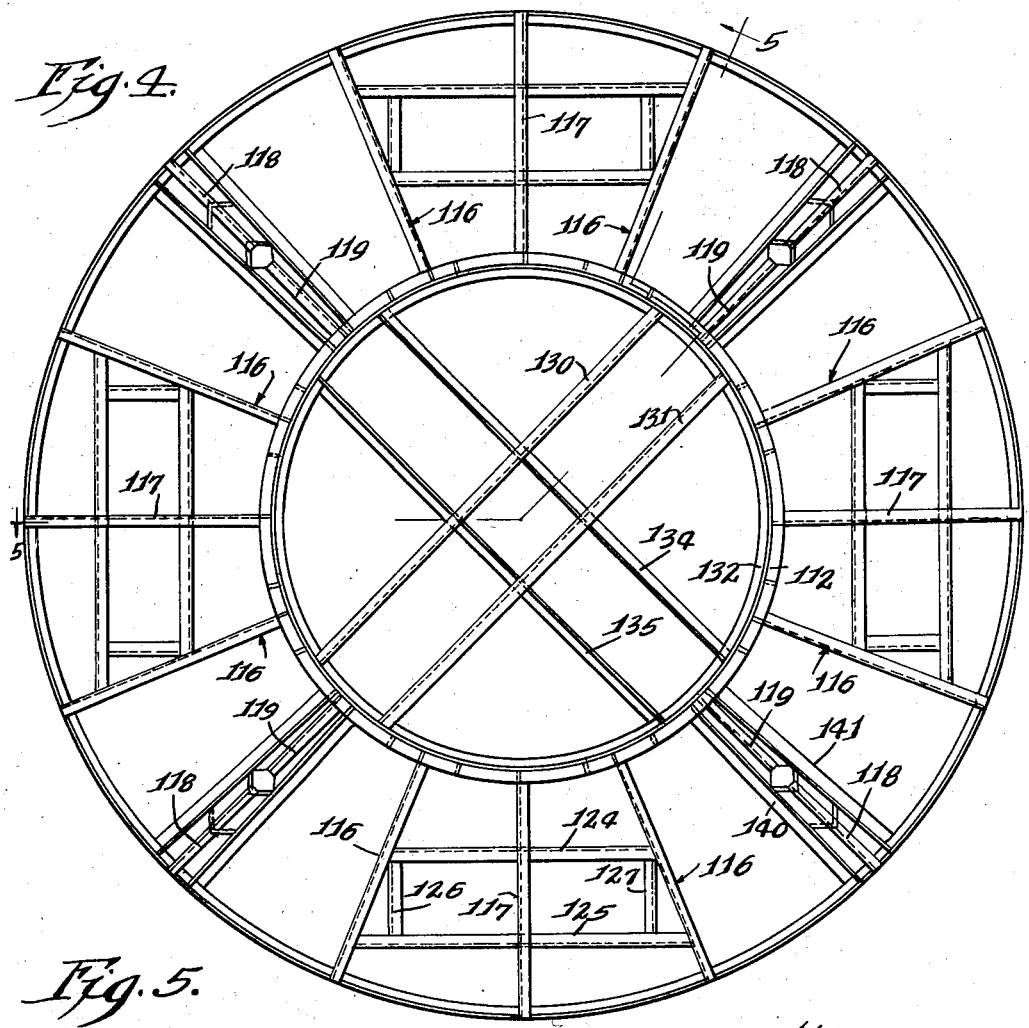
Fig. 4 is a plan view of the top section of the framework skeleton shown in Fig. 3.
Fig. 5 is a cross-sectional view taken along line 5—5 of Fig. 4.

The entire frame structure for the roof section 10 is so arranged that it can be preassembled and then rigidly secured to the vertical columns 16 to 19 in a manner now to be described, referring particularly to Fig. 4. A pair of heavy gage spaced roof supports 140 and 141 are rigidly secured between the lower inner ring 110 and the lower outer ring 114 of the roof section at points ninety degrees apart. Each pair of roof supports is spaced apart just sufficient to receive one of the vertical columns 16 to 19 therebetween. In mounting the preassembled frame structure for the roof section 10 on the unit, the frame structure is lowered on the preassembled bottom portion with the vertical columns 16 to 19 received between respective pairs of roof supports 140, 141 to the proper location, whereupon the roof supports are securely welded to the respective columns. The ribs portions 118 and 119 are then welded between the respective rings 112 and 114 and each of the columns 16 to 19 as shown in Fig. 3.

Figs. 6 to 10 illustrate the manner in which appliances may be arranged within the unit for maximum convenience. A freezer compartment 150 (Figs. 6 and 7) covered by a pair of outwardly hinged, sloping doors 151 is provided on one side with flat shelves 153 and 154 on each side thereof. A cooler compartment 155 is provided directly beneath the freezer compartment and is provided with a pair of doors 156 (Fig. 7). A shelf 157 is provided directly below the supporting surface 154 on one side of the freezer compartment 150 and a plurality of shelves 158 are provided on the other side of the freezer compartment and alongside the cooler compartment 155. The freezer compartment 150 and the cooler 155 may preferably be fabricated as a unit and supported directly on the three floor braces 46' (Fig. 2).

A work counter 160 (Figs. 6 and 9) is arranged across the side opposite the access door 56. The work counter 160 is supported on the ring 34 and on a cross support member 162 extending across a segment of the ring 34, and is provided with a back plate 164. A suitable sink 166 for washing dishes is recessed in the service counter 160. The space beneath the counter 160 serves as a storage compartment and is provided with a floor 168 supported on the cross braces 147 (Fig. 2) and is closed by a pair of doors 170 (Fig. 8).

A storage compartment 180 is provided in the side of the unit to the right of the access door 56 to give additional storage space. The top 182 of the compartment 180 is flat and serves to support electric grilles, hamburger fryers, etc. The compartment 180 may be prefabricated as a unit, and is supported at the front on the floor support 41 (Fig. 2) and at the rear on a frame member 184 bridging the brace members 46 (Fig. 2). A frame member 186 (Fig. 8), secured across the ring 34, forms the back stop for the storage compartment 180.

Other arrangements of storage compartments and utilities suitable for the particular use intended may, of course, be provided, and the particular compartments and utilities described are shown merely for the sake of illustration.

A removable floor 190 is made in two parts and is supported on the floor support members 41 to 44 and on the cross brace 50.

Suitable plumbing (not shown) is preferably provided for supplying water to the unit and for carrying waste water away from it. The unit may, of course, be provided with a water tank and a tank for waste disposal if utilities are not available. Electric power may be supplied to the unit by way of any suitable power connection (not shown).

Glass panels 190 (Fig. 1) are slidably supported on runners 192 (Fig. 10) disposed between the columns 16 to 19 and the vertically extending sides of the angle beams 62 to 65 to permit the unit to be completely closed up in inclement weather and when not in use, or closed up only on that side which is exposed to rain or wind.

It will thus be seen that the frame construction of the unit is such as to provide a rigid, yet relatively light construction that lends itself to a great many uses. It may be transported from place to place as desired merely by lifting it by the four spaced eyebolts 30 rigidly secured to the ends of the columns 16 to 19. It may readily be closed up against inclement weather and provides a sanitary and convenient arrangement particularly suitable for dispensing foods. The particular frame construction described permits the unit to be lifted by the eyebolts 30 without any deformation on the unit even if the lifting force is applied unequally on the bolts.

While only a particular embodiment of the invention has been described and illustrated it will be evident to those skilled in the art that various changes and modifications may be made therein without departing from the true scope of the invention.

I claim:
1. A portable building structure comprising a frame and covering material; said frame including a base ring, floor framing secured to said base ring, a plurality of columns secured to and extending upwardly from said base ring, a second ring of substantially the same diameter as said base ring secured to said columns substantially above said base ring, a third ring of substantially larger diameter than said base ring, a plurality of brackets secured to said columns and to said third ring and supporting said third ring substantially above and concentric with said second ring, a plurality of straight frame members secured to and extending between successive ones of said columns at substantially the same level as said third ring, a fourth ring of substantially the same diameter as said third ring, and a plurality of brackets secured to said columns and to said fourth ring and supporting said fourth ring substantially above said third ring and concentric therewith; said covering material including flooring on said floor framing, cylindrical paneling encircling said frame and extending between said base ring and said second ring, a counter extending from said third ring inwardly to at least said frame members, covering material encircling said frame and extending from said second ring to said third ring, a ceiling extending inwardly from said fourth ring, and a roof covering the top of said portable building structure and extending to said fourth ring; and means secured to said columns for permitting convenient lifting of said building structure.

2. The portable building structure of claim 1 wherein said covering material extending from said second ring to said third ring is convex outwardly and downwardly in vertical planes, and the edge portion of said roof is convex outwardly and upwardly in vertical planes.

3. A portable building structure comprising a frame and covering material; said frame including a base ring, floor framing secured to said base ring, a plurality of columns secured to and extending upwardly from said base ring, a second ring of substantially the same diameter as said base ring secured to said columns substantially above said base ring, a third ring of substantially larger diameter than said base ring, a plurality of brackets secured to said columns and to said third ring and supporting said third ring substantially above and concentric with said second ring, a plurality of straight frame members secured to and extending between successive ones of said columns at substantially the same level as said third ring, a fourth ring of substantially the same diameter as said third ring, and a plurality of brackets secured to said columns and to said fourth ring and supporting said fourth ring substantially above said third ring and concentric therewith; said covering material including flooring on said floor framing, cylindrical paneling encircling said frame and extending between said base ring and said second ring, a counter extending from said third ring inwardly at least to said frame members, covering material encircling said frame and extending from said second ring to said third ring, a plurality of panels forming a wall lying substantially along the lines of said straight frame members and extending from the level of said third ring to the level of said fourth ring, at least one of said panels being openable to permit communication therethrough, a ceiling extending from said fourth ring inwardly at least to said last-mentioned wall, and a roof covering the top of said portable building structure and extending to said fourth ring; and means secured to said columns for permitting convenient lifting of said building structure.

4. The portable building structure of claim 3 wherein said plurality of panels extending from the level of said third ring to the level of said fourth ring are primarily of transparent material.

5. A portable building structure comprising a frame and covering material; said frame including a base ring, floor framing secured to said base ring, a plurality of columns secured to and extending upwardly from said base ring, a second ring of substantially the same diameter as said base ring secured to said columns substantially above said base ring, a third ring of substantially larger diameter than said base ring, a plurality of brackets secured to said columns and to said third ring and supporting said third ring substantially above and concentric with said second ring, a plurality of straight frame members secured to and extending between successive ones of said columns at substantially the same level as said third ring, a fourth ring of substantially the same diameter as said third ring, a fifth ring of substantially smaller diameter than said base ring, a sixth ring of substantially the same diameter as said fifth ring, and braces securing said fourth, fifth and sixth rings in spaced concentric relationship with said fourth and fifth rings lying in the same plane and with said sixth ring spaced substantially from said fifth ring, some of said braces being secured to said columns, whereby said fourth ring is supported concentric with and substantially above said third ring and said sixth ring is arranged above said fourth and fifth rings; said covering material including flooring on said floor framing, cylindrical paneling extending between said base ring and said second ring, a counter extending from said third ring inwardly at least to said frame members, covering material extending from said second ring to said third ring, a plurality of panels forming a wall lying substantially along the line of said straight frame members and extending from the level of said third ring to the level of said fourth ring, at least one of said panels being openable to permit communication therethrough, a ceiling extending from said fourth ring inwardly to said fifth ring, and a roof covering the top of said portable building structure and extending over said sixth ring and to said fourth ring; and means secured to said columns for permitting convenient lifting of said building structure.

6. The portable building structure of claim 5 wherein said plurality of panels extending from the level of said third ring to the level of said fourth ring are primarily of transparent material.

7. The portable building structure of claim 5 wherein said covering material extending from said second ring to said third ring is convex outwardly and downwardly and the portion of said roof extending between said sixth ring and said fourth ring is convex outwardly and upwardly in vertical planes.

8. The portable building structure of claim 7 wherein some of said braces extend from said sixth ring to said fourth ring and are convex outwardly and upwardly whereby a substantial storage space is defined by said ceiling and the convex portion of said roof.

References Cited in the file of this patent

UNITED STATES PATENTS

| 604,277 | Tofft | May 17, 1898 |
| 1,861,405 | Brantferger | May 31, 1932 |
| 2,037,895 | Gugler | Apr. 21, 1936 |
| 2,356,768 | Ladon | Aug. 29, 1944 |
| 2,557,878 | Lankenau | June 19, 1951 |
| 2,775,794 | Keely | Jan. 1, 1957 |